United States Patent
Vezzoli et al.

(10) Patent No.: US 7,882,940 B2
(45) Date of Patent: Feb. 8, 2011

(54) PISTON FOR BRAKE CALIPERS, AND BRAKE CALIPER COMPRISING SAID PISTON

(75) Inventors: Giancarlo Vezzoli, Brescia (IT); Gabriele Di Pietro, Pistoia (IT)

(73) Assignee: Formula S.R.L., Prato (IT)

( * ) Notice: Subject to any disclaimer, the term of this patent is extended or adjusted under 35 U.S.C. 154(b) by 0 days.

(21) Appl. No.: 12/523,897

(22) PCT Filed: Dec. 24, 2007

(86) PCT No.: PCT/IB2007/004157
§ 371 (c)(1),
(2), (4) Date: Jul. 21, 2009

(87) PCT Pub. No.: WO2008/093161
PCT Pub. Date: Aug. 7, 2008

(65) Prior Publication Data
US 2010/0096221 A1  Apr. 22, 2010

(30) Foreign Application Priority Data
Jan. 31, 2007 (IT) .......................... FI2007A0017

(51) Int. Cl.
*F16D 65/20* (2006.01)
(52) U.S. Cl. .................................................. 188/72.4
(58) Field of Classification Search ............... 188/72.4, 188/72.5, 368–370
See application file for complete search history.

(56) References Cited

U.S. PATENT DOCUMENTS

| 3,421,604 A | * | 1/1969 | Hobbs | 188/72.5 |
| 3,773,148 A | * | 11/1973 | Jean-Claude et al. | 188/72.4 |
| 4,776,641 A | * | 10/1988 | Bulling | 303/4 |

FOREIGN PATENT DOCUMENTS

| DE | 10215935 | 10/2003 |
| EP | 1 167 807 | 1/2002 |
| GB | 2 282 648 | 4/1995 |
| WO | WO 02/099305 | 12/2002 |

* cited by examiner

*Primary Examiner*—Christopher P Schwartz
(74) *Attorney, Agent, or Firm*—McGlew and Tuttle, P.C.

(57) ABSTRACT

A brake caliper, especially for motorcycle applications, comprises a main rigid body, which can be coupled with a portion of a structure or a vehicle, and defining at least one seat (5); at least one piston (4) slidingly housed in the respective seat (5) and associated with fluid sealing means (22) and with elastic means (19) acting between the piston (4) and the seat (5) to cause at least an action of elastic return to the piston (4) during the sliding thereof, and defining—in cooperation with the respective seat (5) wherein it is inserted and with the elastic means (19)—a first chamber (21) in fluid communication with actuation means. The piston (4) further exhibits a side surface (11) which delimits, in cooperation with a side surface (17) of the respective seat (5), with the sealing means (22) and with the elastic means (19), a second chamber (24), and finally comprising also tapping means to provide a fluid communication between the first chamber (21) and the second chamber (24).

14 Claims, 4 Drawing Sheets

PISTON FOR BRAKE CALIPERS, AND BRAKE CALIPER COMPRISING SAID PISTON

TECHNICAL FIELD OF THE INVENTION

The object of the present invention is a piston for brake calipers.

The piston and the caliper according to the invention find application preferably in the vehicle field, in particular but not in a limited sense, for motorcycle applications, as well as in general in machinery or structures in which the need can arise for braking rotating members by means of disc brakes.

BACKGROUND ART

As it is known, the brake calipers are used in a very large range of road and railway vehicles, and aircrafts as well, and provide for the generation of a braking force through the interaction between said calipers, which are generally solid to the frame of the vehicle, and one or more discs solid to the wheels thereof.

A first type of known brake calipers comprises a single small piston, sliding within a respective seat formed on a side of the brake calipers under the action of a fluid, generally a fluid under pressure.

Such small piston is generally disposed on one side and is engaged on at least one braking pad able to mate with friction a respective side surface of a braking disc.

Also known are calipers wherein more pistons are provided disposed in facing relationship to each other.

Each caliper is also connected with an actuation device, generally a manually-operated lever or a footboard, said device being engaged by a user to generate a braking force. In the modern applications, the actuation device is operatively connected with the brake caliper through a system of conduits which put the actuation device into fluid communication with the brake caliper and is able to transmit a pressure, also of high value, to the brake caliper.

In the known embodiments, each piston is slidingly received within a respective seat formed in the body of the brake caliper, and is driven into slide motion by the action of the fluid under pressure which, in turn, is controlled by actuation means such as hydraulic pumps, for example.

The piston, therefore, slides operatively inside the respective seat under the action of the pressurized fluid, in particular to shift from a first rest position to an active position in which it exerts a thrust toward the braking disc.

The above cited fluid seal is obtained by the interposition of an elastic gasket, engaged to a side portion of the seat formed in the caliper body, which prevents the outward bleeding of the pressurized fluid. Moreover, the gasket has the function to deform elastically during the operative sliding of the piston, the latter, after completion of its working stroke, tending afterwards to move back, at least partially, to the retracted position inside the cylinder owing to the elastic return of the same gasket ("rollback" action of the piston).

Unfortunately, it has been found that the presence of fluid pressure on only one side of the gasket tends to oppose the rollback action, inasmuch as it prevents the elastic return of the deformed gasket.

Other known solutions provide for interposing, between the piston and respective seat, a pair of gaskets engaged in suitable recesses formed in the seat. A first gasket, having a proper fluid-sealing function, is located at a position further inside with respect to the piston's sliding direction, toward a bottom portion of the seat, and prevents the outwardly bleeding of pressurized oil. The other gasket, on the other hand, has a protecting function against dust.

Unfortunately, such a system requires to work out one or more recesses in the seat for fitting the gaskets.

DISCLOSURE OF THE INVENTION

The technical task of the present invention is therefore to overcome the above mentioned drawbacks.

Within the scope of such technical task, it is a primary object of the invention to provide a piston for brake calipers, and a brake caliper comprising said piston, which provide for an efficient rollback action of the piston.

It is a further important object of the invention to provide a piston for brake calipers, and a brake caliper comprising said piston, which are able to simplify the geometry of the utilized components and reduce therefore the times and costs of production, in particular by simplifying the necessary mechanical operations.

It is finally an important object of the invention to provide a piston for brake calipers, and a brake caliper comprising said piston, which determine an efficient sealing condition against outward leakage of the fluid.

The said and further objects are substantially achieved by a piston for brake calipers, and a brake caliper comprising said piston, according to what is set forth in the appended claims.

Described hereunder by way of non-exclusive example is a preferred embodiment of a piston for brake calipers, and a brake caliper comprising said piston, as illustrated in the accompanying drawings, wherein.

Figure 1:
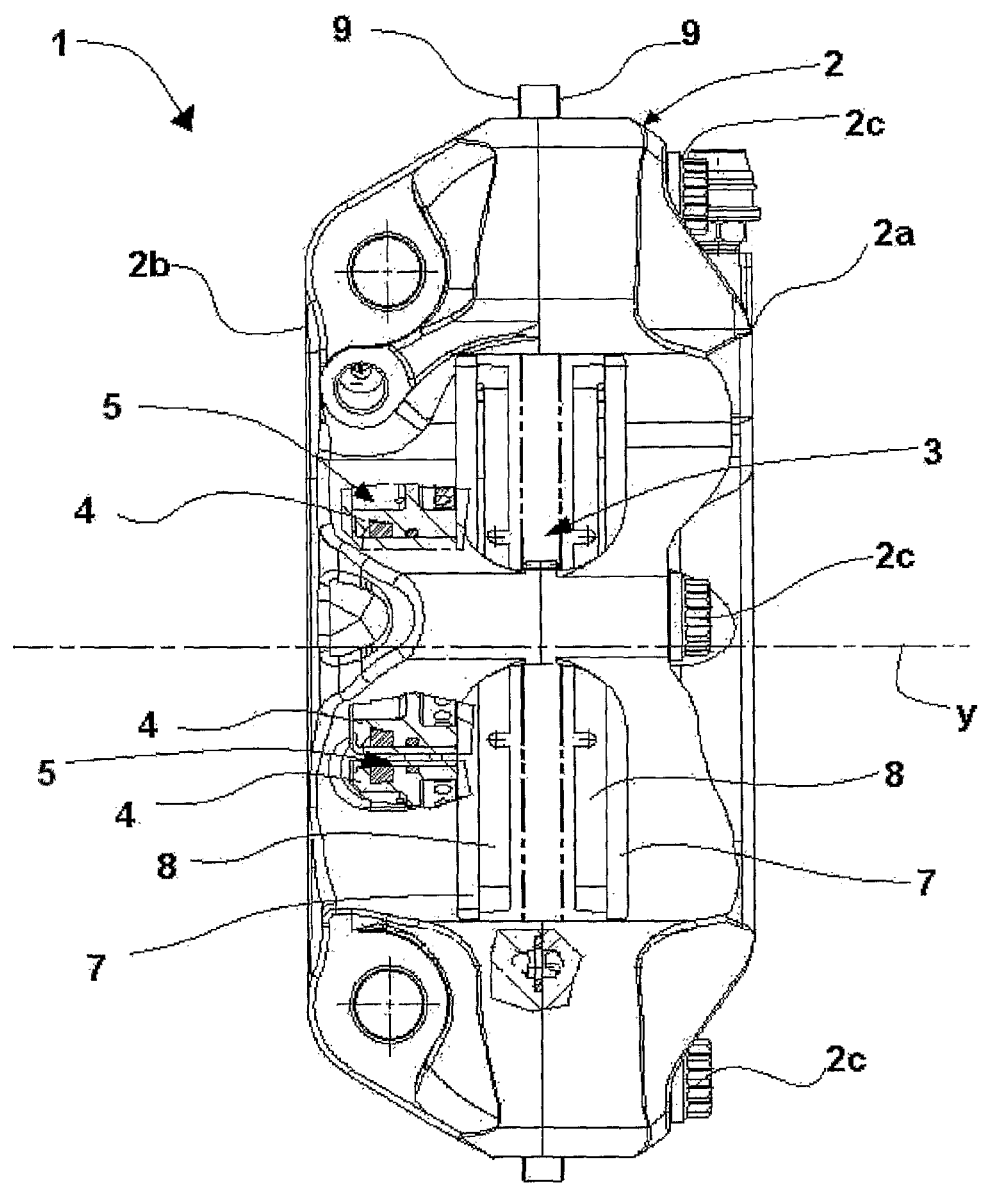
FIG. 1 is a view partially in section of a brake caliper according to the invention.

Numeral 1 indicates as a whole a brake caliper according to the invention.

The brake caliper 1 comprises a main body 2, which is generally fixed rigidly or in a floating way to a portion of the vehicle or an operating machine (not shown in the attached figures).

In the preferred embodiment, the main body is made up of two halves 2a, 2b which engage with each other and are removably coupled my means of threaded members 2c, but it is understood that the main body 2 may be made in one piece.

The brake caliper 1 is operatively associated with a braking disc 3 by engaging with friction therewith to transmit braking forces through pads 8. The braking disc 3, solid to a rotating body to be decelerated, is partially received inside the main body 2, according to a known configuration not be described in greater detail.

FIG. 1 further shows, in a view partially in section, the presence of small pistons 4, housed in suitable seats 5 formed in the two halves 2a, 2b. In the described example, each half-part 2a, 2b exhibits three seats 5. The three seats 5 of each half-part 2a, 2b are disposed in opposing position to three seats 5 of the other half-part 2a, 2b. Each piston 4 is geometrically coupled to a respective seat so as to allow the same piston 4 to move inside the respective seat 5, preferably parallel to an axis "Y" about which the disc 3 rotates.

Figure 2:
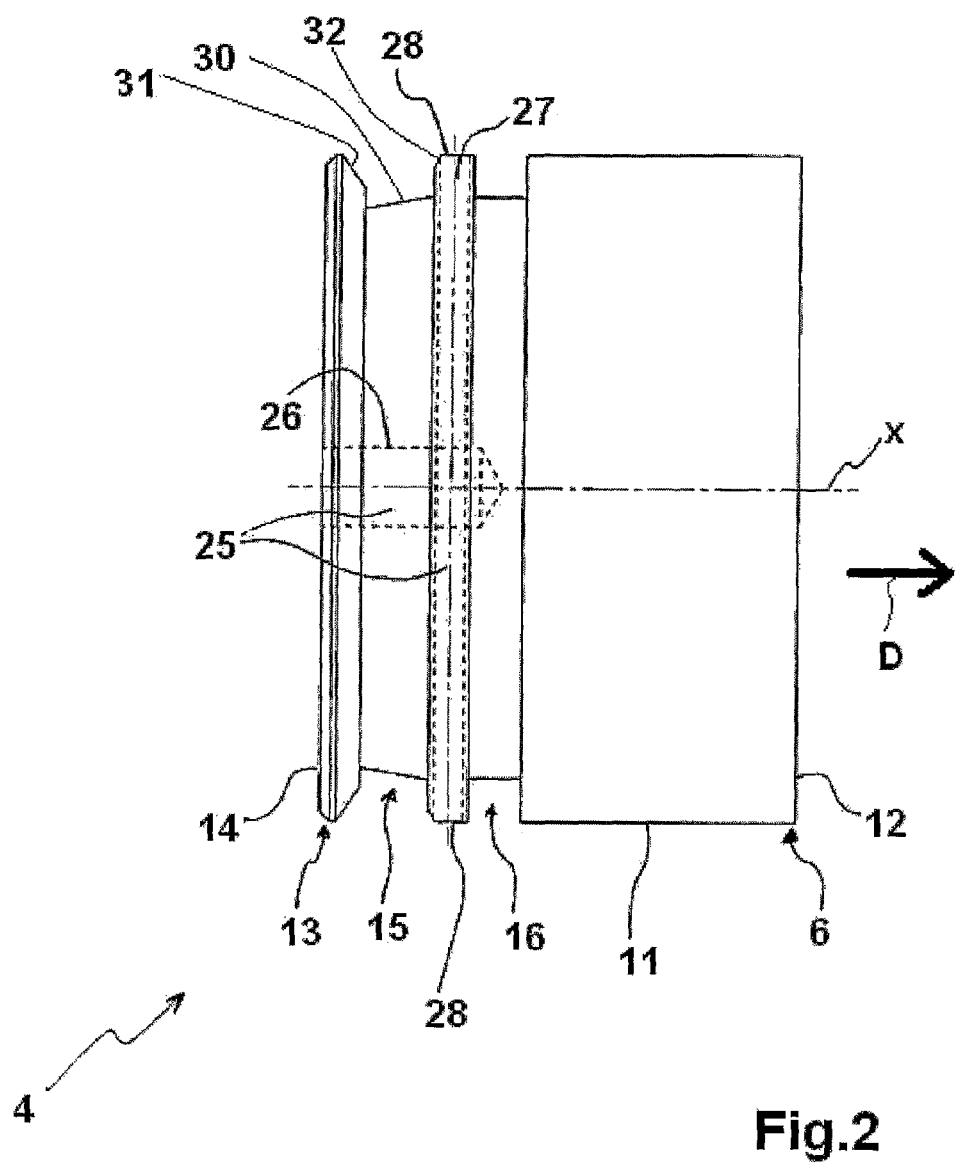
FIG. 2 is a side view of a piston according to the invention.

With reference to FIG. 2, the small pistons 4, in correspondence of an external end 6 thereof, interact with the supports 7, either directly or indirectly (for example through isolating elements, not shown).

Disposed on the supports 7 is a friction material 8 able to mate with disc 3 by friction, as shown in FIG. 1. In particular, each set of three small pistons 4 is associated with one or more pads each of which including the supports 7 and the friction material 8, so that the brake caliper 1 includes at least two pads 8, each one being associated with a respective side surface 9 of disc 3. The pads 8 are of known type, so that they will not be described hereunder in greater detail.

FIG. 2 shows a preferred embodiment of a piston 4 according to the invention. Such piston 4 exhibits a first cylindrical side surface 11 which is delimited, in correspondence of the external portion 6, by an external, preferably flat surface 12. Each piston 4 has an internal end 13 opposite to the external end 6, delimited by an internal surface 14 and shaped with a bevel 31.

The piston 4 is also provided, in proximity of the internal end 13, with a first slot 15 extending preferably throughout the circumferential development of the piston 4, and is preferably axial-wise symmetric to the direction "X". In particular, the first slot 15 is formed so that a deeper portion thereof be located in the direction of the internal end 13 of piston 4, for reasons to be explained herebelow.

The piston 4 also exhibits a second slot 16, preferably coaxial to the first slot 15. This second slot 16 having preferably a rectangular section.

As illustrated in FIG. 2, the first slot 15 is located in a position close to the internal end 13 of piston 4, while the second slot 16 is located side-by-side with the first slot 15, the two slots being separated by a further side surface 28 in the direction of the external end 6 for reasons to be explained herebelow.

Figure 3:
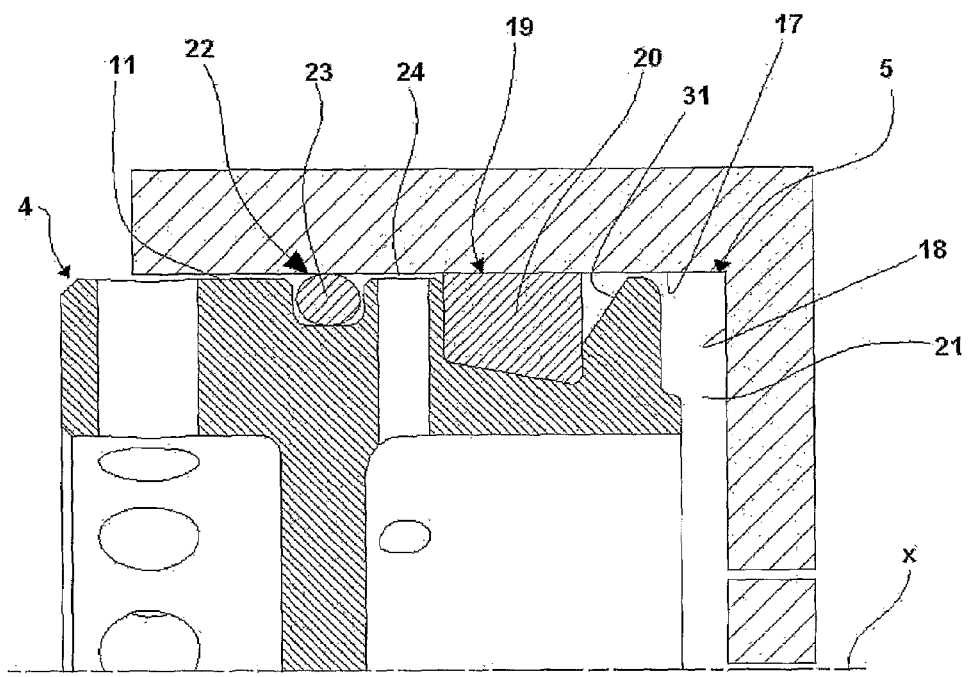
FIG. 3 is a section view of a portion of the brake caliper of FIG. 1 in an inoperative position.
Figure 4:
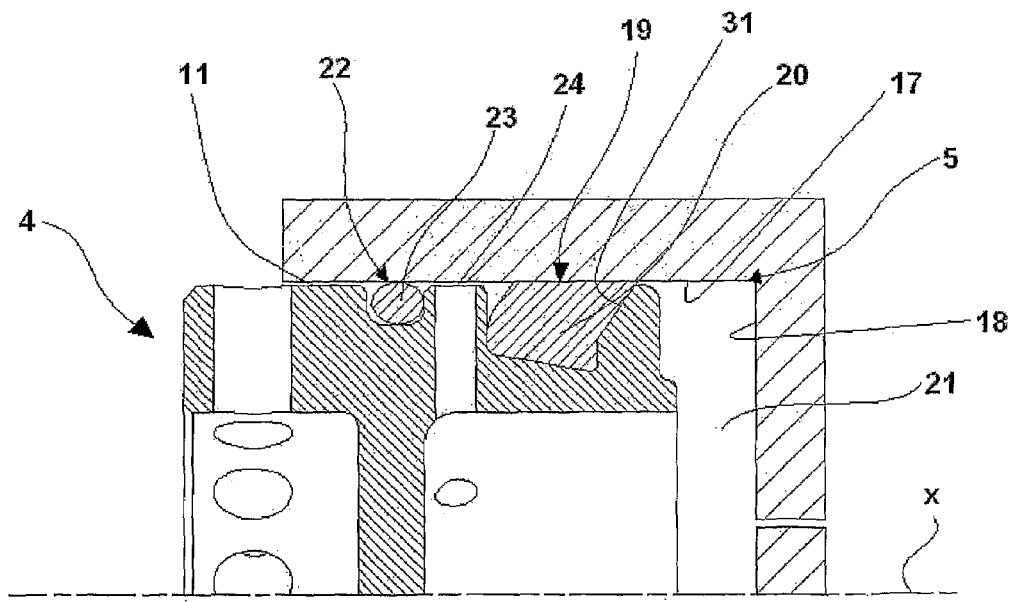
FIG. 4 is section view of a portion of the brake caliper of FIG. 1 in an operating position.

FIGS. 3 and 4 are section views of the piston 4 in two positions taken up during the operation while the same piston is housed in the respective seat 5.

The said seat 5 has a cylindrical side surface 17 and a bottom surface 18, preferably of circular shape.

The brake caliper 1 comprises also elastic means 19, 22, interposed between each piston 4 and the relevant seat 5. These elastic means 19, 22 are advantageously fixed to the piston 4, in particular in correspondence of the first slot 15 and second slot 16.

Moreover, the elastic means 19 are preferably made up of a first gasket 20 having preferably square or rectangular cross-section; whereas the elastic means 22 are preferably of circular cross-section.

The shape of the slot 15, in particular the presence of the bevel 31, has the function of improving the behaviour of the elastic means 19, especially in the direction of return of piston 4, in order to exert an efficient return action of piston 4 and bring the latter to the inoperative position.

To this end, the seat 15 has the inner wall 30 inclined to the piston's axis "X" and diverging from its pressure direction D; while the inner end 13 has the bevel 31 inclined to the axis "X" and converging toward the pressure direction D.

As best shown in FIGS. 3 and 4, this solution makes it possible to improve the effect of return due to the deformation of the gasket during the pressure stroke of the piston and, therefore, facilitates the detachment of the pad from the disc upon completion of the braking.

The elastic means 19 delimit, in cooperation with the piston 4 and respective seat 5, a first chamber 21 in fluid communication with actuation means, such as a hydraulic actuator manually-operated (by a lever) or pedal-operated (by a footboard), said means being known and not requiring further illustration. In particular, the first chamber is delimited by elastic means 19, by the inner surface 14 of piston 4, and by the lateral 17 and bottom 18 surfaces of seat 5.

In this way, upon a command generated by the actuation means, the piston 4 receives a thrust along the axis X and tends thereby to slide along such direction X. According to the known operation principle, the piston 4 is movable between an operative position (shown in FIG. 4), in which it exerts a braking thrust onto the disc 3, and an inoperative position (shown in FIG. 3) in which it is substantially retracted in the respective seat 5.

The function of the elastic means 19 is to store elastic energy during the displacement of the piston 4 to release such energy afterwards at the end of same piston's stroke, thereby exerting a counteraction like that of a spring, said counteraction being especially useful for detaching the pads 8 from the disc 3 (rollback action) upon releasing the command of the actuation means.

Figure 5:
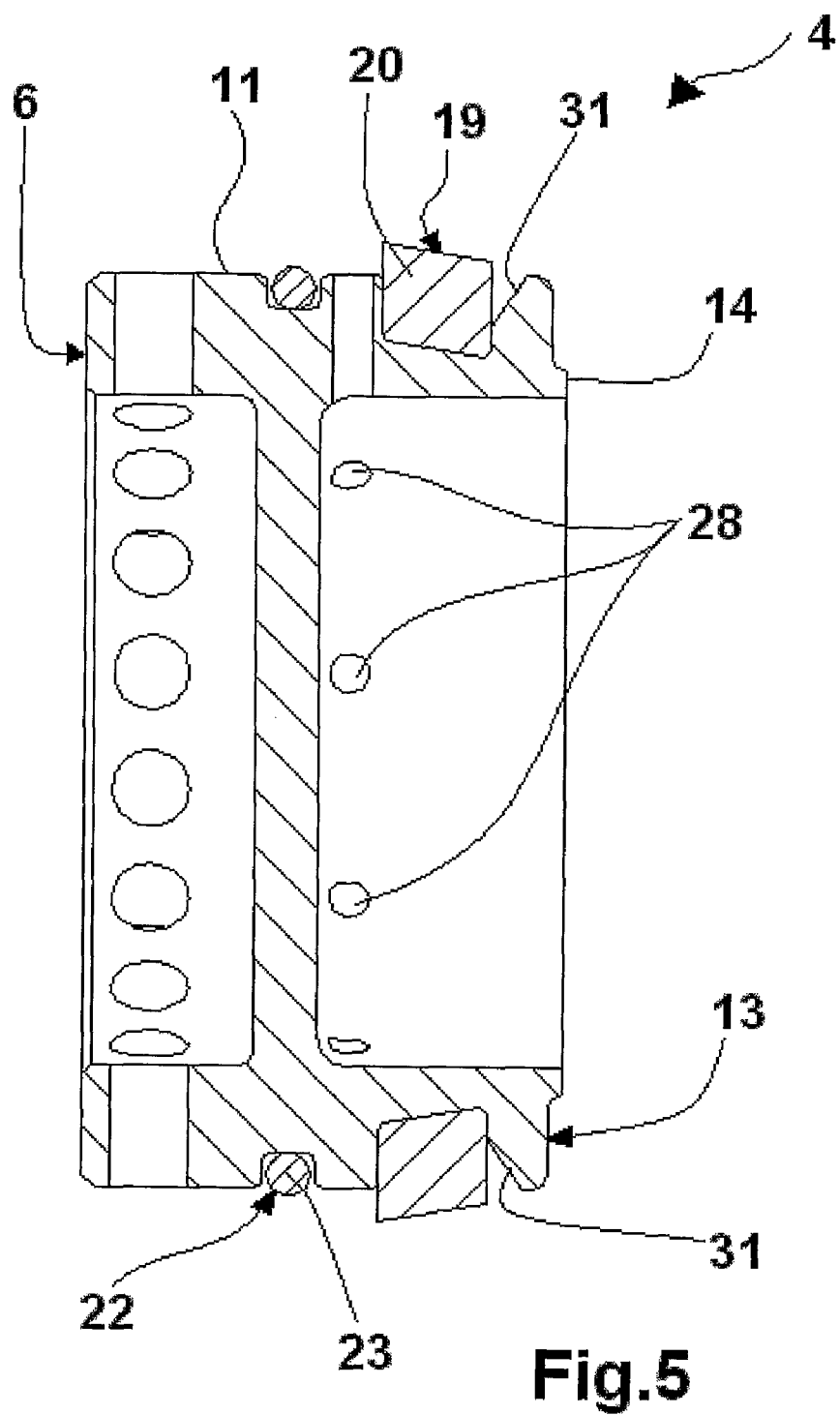
FIG. 5 is a section view of the piston in FIG. 2.

The brake caliper 1 also comprises sealing means 22, preferably made up of a second gasket 23. This second gasket is advantageously mounted on the piston 4, in particular in correspondence of the second slot 16, as illustrated also in FIGS. 3 to 5, and has preferably an annular shape.

In this way, the side surface 28 of the piston delimits—in cooperation with the elastic means 19, the sealing means 22 and the side surface 17 of the seat 5—a second, fluid-tight chamber 24.

Advantageously, the brake caliper 1 also comprises tapping means 25, for example one or more holes, able to put in fluid communication the first chamber 21 and second chamber 24. Preferably, the tapping means 25 comprise one or more conduits in fluid communication with the first 21 and second 24 chamber. Preferably, the tapping means 25 are formed on the piston 4.

FIG. 2 shows a preferred embodiment of said tapping means 25, which comprise a first conduit 26 substantially coaxial to the piston 4, and a second conduit 27 disposed transverse to the first conduit 26 with which it is in fluid communication. In particular, the second conduit 27 extends in diametral direction and leads to the side surface 11 of piston 4 in correspondence of two holes 28 preferably located at diametrically opposite positions. These holes 28 are clearly visible in FIG. 5.

In general, the tapping means 25 may be provided through a plurality of conduits, generally oriented and in fluid communication with the first 21 and second 24 chamber.

What has been described hereinbefore is however non-limitative, inasmuch as the brake caliper 1 according to the invention lends itself to different construction solutions. In particular, the tapping means 25 can be formed directly on the body 2 of the brake caliper 1, for example by making one or more conduits in correspondence of each seat 5.

The present invention achieves major advantages.

The assembling of the two gaskets onto the piston, in the first place, avoids costly and complex work operations (the milling of the caliper body, for the most part) on the side surface of the seat, consequently reducing times and costs for the manufacturing of the components since, as well known in the art, the milling operation on the inner surface of a hole is more complex than turning an outer surface.

The presence of the tapping means, moreover, makes it possible to create, inside the second chamber, a correlated pressure present in the first chamber, thereby reducing the counteracting effects which in the prior art would oppose the elastic return of the gasket performing such function. In fact, the invention allows putting the fluid under pressure on both sides of the first gasket, so as to allow the latter to freely perform its elastic return and to ensure a prompt rollback action.

The invention thus conceived is evidently suited for industrial application; the same invention can also be subjected to several modifications and changes falling within the scope of the inventive idea; moreover, all the parts may be replaced by other elements technically equivalent.

The invention claimed is:

1. A brake caliper for disc brakes, comprising:
   a main rigid body, which can be coupled with a portion of a structure or a vehicle in proximity of a braking disc, said main body defining at least one seat;
   at least one piston slidingly housed in said at least one seat and movable between an operative position to exert, by a layer of friction material, a thrust on the braking disc, and an inoperative position in which said piston is detached from said disc;
   a fluid-sealing means fixed on each piston and acting between the piston and the respective seat;
   an elastic means fixed on each piston and acting between the piston and the respective seat to exert at least an action of elastic return onto the piston during the sliding thereof, wherein each piston defines, in cooperation with the respective seat wherein said piston is inserted and with the sealing means, a first chamber in fluid communication with actuation means, each piston comprising a side surface which delimits, in cooperation with a side surface of the respective seat, with the sealing means and with the elastic means, a second chamber: and
   a tapping means to provide a fluid communication between the first chamber and the second chamber.

2. A brake caliper according to claim 1, wherein said tapping means is formed on the piston.

3. A brake caliper according to claim 1, wherein said tapping means is formed on the main body.

4. A brake caliper according to claim 1, wherein said tapping means comprises at least one conduit in fluid communication with the first and the second chamber.

5. A brake caliper according to claim 1, wherein said tapping means comprises a plurality of conduits.

6. A brake caliper according to claim 1, wherein said elastic means comprises a first gasket.

7. A brake caliper according to claim 1, wherein said sealing means comprises a second gasket.

8. A brake caliper according to claim 1, wherein said elastic means is received within a seat having an inner wall inclined to an axis of the piston and diverging from a direction of pressure thereof.

9. A brake caliper according to claim 1, wherein said piston comprises, on one inner end, a bevel inclined to the axis and converging in a direction of pressure to assist the return stroke of said piston.

10. A brake caliper, comprising:
    a main rigid body, which can be coupled with a portion of a structure or a vehicle, and defining at least one seat;
    at least one piston slidingly housed in said at least one seat and movable between an operative position in which said piston exerts a thrust on a braking disc, and an inoperative position in which said piston is detached from said disc;
    a sealing means fixed on each piston and acting between the piston and the respective seat; and
    an elastic means fixed on each piston and acting between the piston and the respective seat to exert at least an action of elastic return onto the piston during the sliding thereof, each piston defining, in cooperation with the respective seat wherein said piston is inserted and with the elastic means, a first chamber in fluid communication with actuation means, each piston comprising a side surface which delimits, in cooperation with a side surface of the respective seat, with the sealing means and with the elastic means, a second chamber, said piston comprising a tapping means for providing a fluid communication between the first chamber and the second chamber.

11. A piston for brake calipers, comprising:
    a brake caliper structure, said brake caliper structure comprising a main rigid body which can be coupled with a portion of a structure or a vehicle, said main rigid body defining at least one seat; and
    a piston structure, said piston structure being slidingly received in a respective seat and movable between an operative position to exert a thrust on at least one braking disc, and an inoperative position in which said piston is detached from said disc, said piston structure being associated with a fluid sealing means acting between the piston structure and the respective seat, and with an elastic means acting between the piston structure and the respective seat to cause at least an action of elastic return on the piston structure during the sliding thereof, said piston structure defining, in cooperation with the respective seat wherein said piston structure is inserted and with the elastic means, a first chamber in fluid communication with actuation means, each piston structure comprising a side surface which delimits, in cooperation with a side surface of the respective seat, with the sealing means and with the elastic means, a second chamber, said piston structure comprising a tapping means for providing a fluid communication between the first chamber and the second chamber, said elastic means and said sealing means being fixed to the piston structure.

12. A piston according to claim 11, wherein said first slot comprises an inner wall inclined to an axis of said piston structure and diverging from a direction of pressure to improve the elastic behavior of said elastic means.

13. A piston according to claim 12, wherein said piston structure comprises, on an internal end, a bevel inclined to the axis and converging in the direction of pressure to assist the return stroke of said piston structure.

14. A piston according to claim 11, wherein said elastic means is fixed to said piston structure in correspondence of a first slot and of a second slot.

* * * * *